United States Patent
Yamamura et al.

(10) Patent No.: US 12,507,618 B2
(45) Date of Patent: Dec. 30, 2025

(54) WORK MACHINE AND PROCESSING DEVICE

(71) Applicant: HONDA MOTOR CO., LTD., Tokyo (JP)

(72) Inventors: Makoto Yamamura, Wako (JP); Takamasa Udagawa, Wako (JP); Hiroto Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 360 days.

(21) Appl. No.: 17/834,125

(22) Filed: Jun. 7, 2022

(65) Prior Publication Data
US 2022/0295699 A1    Sep. 22, 2022

Related U.S. Application Data

(63) Continuation of application No. PCT/JP2019/050119, filed on Dec. 20, 2019.

(51) Int. Cl.
*A01D 34/00* (2006.01)
*A01D 34/64* (2006.01)
(Continued)

(52) U.S. Cl.
CPC ........... *A01D 34/008* (2013.01); *A01D 34/64* (2013.01); *G05D 1/0246* (2013.01); *G06T 7/50* (2017.01);
(Continued)

(58) Field of Classification Search
CPC .... A01D 34/008; A01D 34/64; G05D 1/0246; G06T 7/50; G06T 2207/30261;
(Continued)

(56) References Cited

U.S. PATENT DOCUMENTS 8,026,955 B2   9/2011 Shimada et al.
10,068,141 B2  9/2018 Shiromizu et al.
(Continued)

FOREIGN PATENT DOCUMENTS

JP   2009-056528 A   3/2009
JP   2009-169814 A   7/2009
(Continued)

OTHER PUBLICATIONS

International Search Report for PCT/JP2019/050119 mailed Mar. 3, 2020 with partial English Translation.

*Primary Examiner* — Anne Marie Antonucci
*Assistant Examiner* — Jordan T Smith
(74) *Attorney, Agent, or Firm* — Thomas Horstemeyer, LLP (57) ABSTRACT

A self-propelled work machine that conducts work in a work area, comprising an imaging unit for capturing an image of a surrounding environment and a processing unit, wherein the processing unit performs a first process of detecting a predetermined object based on an imaging result, a second process of determining a degree of a backlight state in the imaging result, and a third process of conducting travel control of the work machine for any of making a turn, stopping, and moving backward in front of the detected object, and in a case where it is determined in the second process that the imaging result is in the backlight state, the processing unit sets a distance from the detected object when conducting the travel control in the third process to the work machine to be larger.

9 Claims, 8 Drawing Sheets

(51) Int. Cl.
  *G05D 1/00* (2006.01)
  *G06T 7/50* (2017.01)
  *G06V 10/60* (2022.01)
  *G06V 20/58* (2022.01)
(52) U.S. Cl.
  CPC .............. *G06V 10/60* (2022.01); *G06V 20/58* (2022.01); *G06T 2207/30261* (2013.01)
(58) Field of Classification Search
  CPC .. G06T 7/00; G06T 7/70; G06V 10/60; G06V 20/58; G06V 20/56
  See application file for complete search history.

(56) References Cited

U.S. PATENT DOCUMENTS

| | | | |
|---|---|---|---|
| 10,297,155 B2* | 5/2019 | Otsuka | G06V 20/584 |
| 10,864,891 B2 | 12/2020 | Haneda et al. | |
| 2006/0050927 A1* | 3/2006 | Klomark | B60R 21/01534 |
| | | | 382/103 |
| 2009/0059033 A1 | 3/2009 | Shimada et al. | |
| 2015/0266489 A1* | 9/2015 | Solyom | B60W 10/04 |
| | | | 701/23 |
| 2016/0039436 A1* | 2/2016 | Bhagwatkar | B61L 27/53 |
| | | | 348/148 |
| 2017/0270369 A1 | 9/2017 | Shiromizu et al. | |
| 2018/0060675 A1* | 3/2018 | Ji | H04N 23/75 |
| 2019/0291728 A1* | 9/2019 | Shalev-Shwartz | B60W 30/09 |
| 2019/0315314 A1 | 10/2019 | Haneda et al. | |
| 2019/0346848 A1* | 11/2019 | Zhou | G05D 1/0088 |
| 2020/0151468 A1* | 5/2020 | Hermalyn | G06V 20/584 |
| 2020/0231142 A1* | 7/2020 | Liu | G01S 13/931 |
| 2023/0046484 A1* | 2/2023 | Fang | B60K 35/22 |

FOREIGN PATENT DOCUMENTS

| | | |
|---|---|---|
| JP | 2017-159801 A | 9/2017 |
| JP | 2017-173875 A | 9/2017 |
| JP | 2018-109849 A | 7/2018 |
| WO | 2017/154456 A1 | 9/2017 |
| WO | 2021/124556 A1 | 6/2021 |

* cited by examiner

WORK MACHINE AND PROCESSING DEVICE

CROSS-REFERENCE TO RELATED APPLICATION(S)

This application is a continuation of International Patent Application No. PCT/JP2019/050119 filed on Dec. 20, 2019, the entire disclosures of which is incorporated herein by reference.

TECHNICAL FIELD

The present invention mainly relates to a self-propelled work machines.

BACKGROUND ART

Some of work machines (for example, lawn mowers) include an imaging unit for imaging a surrounding environment, and the work machine itself detects a work area based on an imaging result by the imaging unit, so that the work machine conducts work (for example, lawn mowing) in the work area (see PTL 1). Such a work machine is also referred to as a self-propelled work machine, an unmanned traveling work machine, or the like. Examples of an imaging object by the imaging unit include an installation object (a fence, a pole, and the like) for partitioning the work area, an obstacle (a tree, a rock, and the like) with which the work machine should avoid contact, and the like.

CITATION LIST

Patent Literature

PTL1: Japanese Patent Laid-Open No. 2018-109849

SUMMARY OF INVENTION

Technical Problem

A CCD/CMOS image sensor is typically used for the above-described imaging unit, that is, the imaging unit photoelectrically converts incident light and detects the incident light to acquire image data indicating the surrounding environment as an imaging result. Therefore, in a case where a light source (for example, the sun) having luminance equal to or larger than a predetermined value is included in an imaging range of the imaging unit, the imaging result may be in a backlight state, and there is a possibility that the detection accuracy of the object based on the imaging result is degraded. This may cause the work machine to come into contact with the object, and may hinder stable travel of the work machine.

The present invention has an exemplary object to enable stable travel of a self-propelled work machine in a relatively easy manner.

Solution to Problem

A first aspect of the present invention is a self-propelled work machine that conducts work in a work area, the work machine comprising an imaging unit configured to capture an image of a surrounding environment, and a processing unit, wherein the processing unit performs a first process of detecting a predetermined object, based on an imaging result by the imaging unit, a second process of determining a degree of a backlight state in the imaging result, and a third process of conducting travel control of the work machine for any of making a turn, stopping, and moving backward in front of the object that has been detected, and in a case where it is determined in the second process that the imaging result is in the backlight state, the processing unit sets a distance from the object that has been detected when conducting the travel control in the third process to the work machine to be larger than a distance in a case where it is determined in the second process that the imaging result is not in the backlight state.

Advantageous Effects of Invention

According to the present invention, stable travel of a self-propelled work machine is enabled.

BRIEF DESCRIPTION OF DRAWINGS

FIG. 3A1 is a diagram illustrating an example of an imaging result by an imaging unit.
FIG. 3A2 is a diagram illustrating an example of an imaging result by the imaging unit.
FIG. 3B1 is a diagram illustrating an example of an imaging result by the imaging unit.
FIG. 3B2 is a diagram illustrating an example of an imaging result by the imaging unit.

DESCRIPTION OF EMBODIMENTS

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

Figure 1:
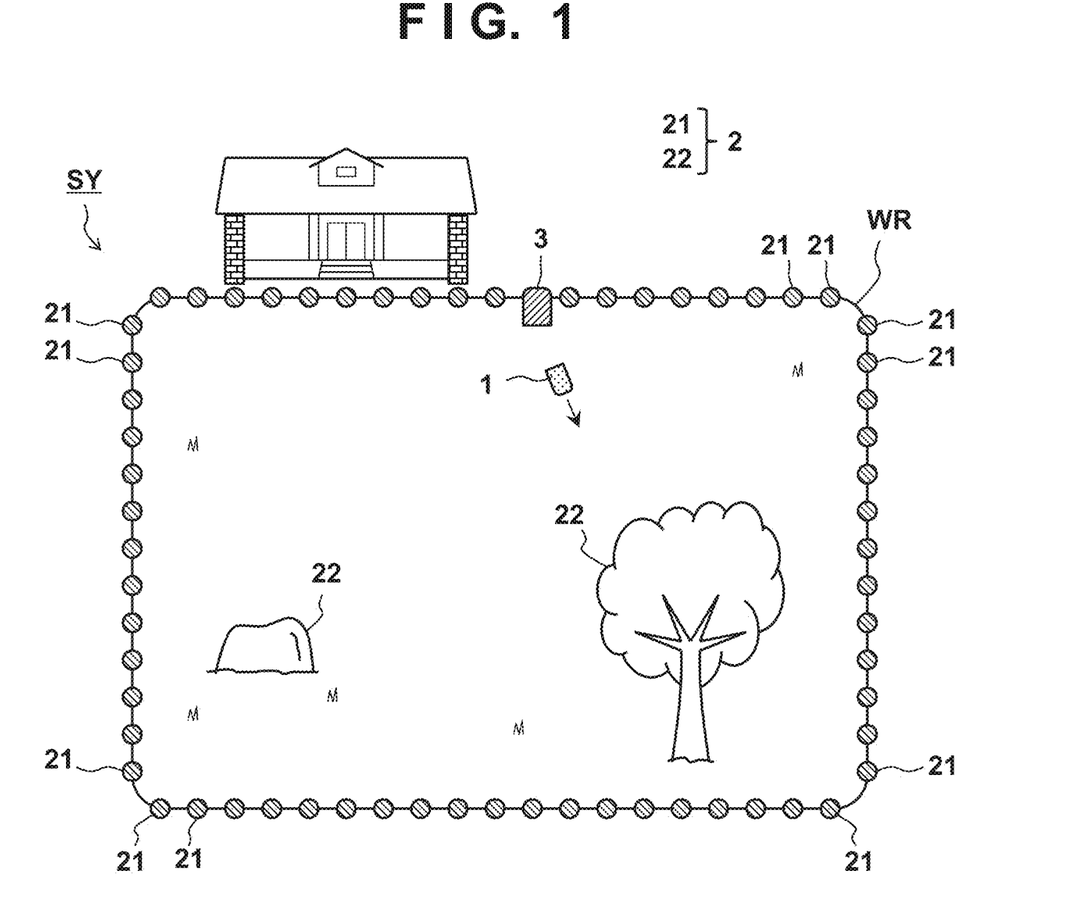
FIG. 1 is a diagram illustrating a configuration example of a work system.

FIG. 1 is a schematic diagram illustrating a configuration example of a work system SY according to a first embodiment. The work system SY includes a work machine 1, one or more objects 2, and a station 3. Although its details will be described later, the work machine 1 is configured to be capable of conducting predetermined work in a work area WR. In the present embodiment, the work machine 1 is a lawn mower that conducts lawn mowing as a work content.

An object 2 is an object with which the work machine 1 should avoid contact, and it does not matter whether it is as a natural object or an artificial object. Examples of the object 2 include an installation object (for example, a fence or a pole) 21 for partitioning the work area WR, an obstacle (for example, a tree or a rock) 22 existing in the work area WR, and the like.

For example, the installation object 21 is installed along the outer edge of the work area WR/to define the work area WR. Although its details will be described later, the work machine 1 makes a turn before reaching the installation object 21 to avoid contact with the installation object 21, and maintains the stable travel in the work area WR.

In addition, for example, the obstacle 22 is disposed in the work area WR. Although its details will be described later, the work machine 1 makes a turn before reaching the obstacle 22 to avoid contact with the obstacle 22, and maintains the stable travel in the work area WR.

The station 3 is usually installed at an edge of the work area WR, and is configured to enable the work machine 1 in a non-working state to be on standby and to enable charging of a battery (a battery 16 to be described later) included in the work machine 1. The station 3 may be expressed as a charging station or the like.

Figure 2:
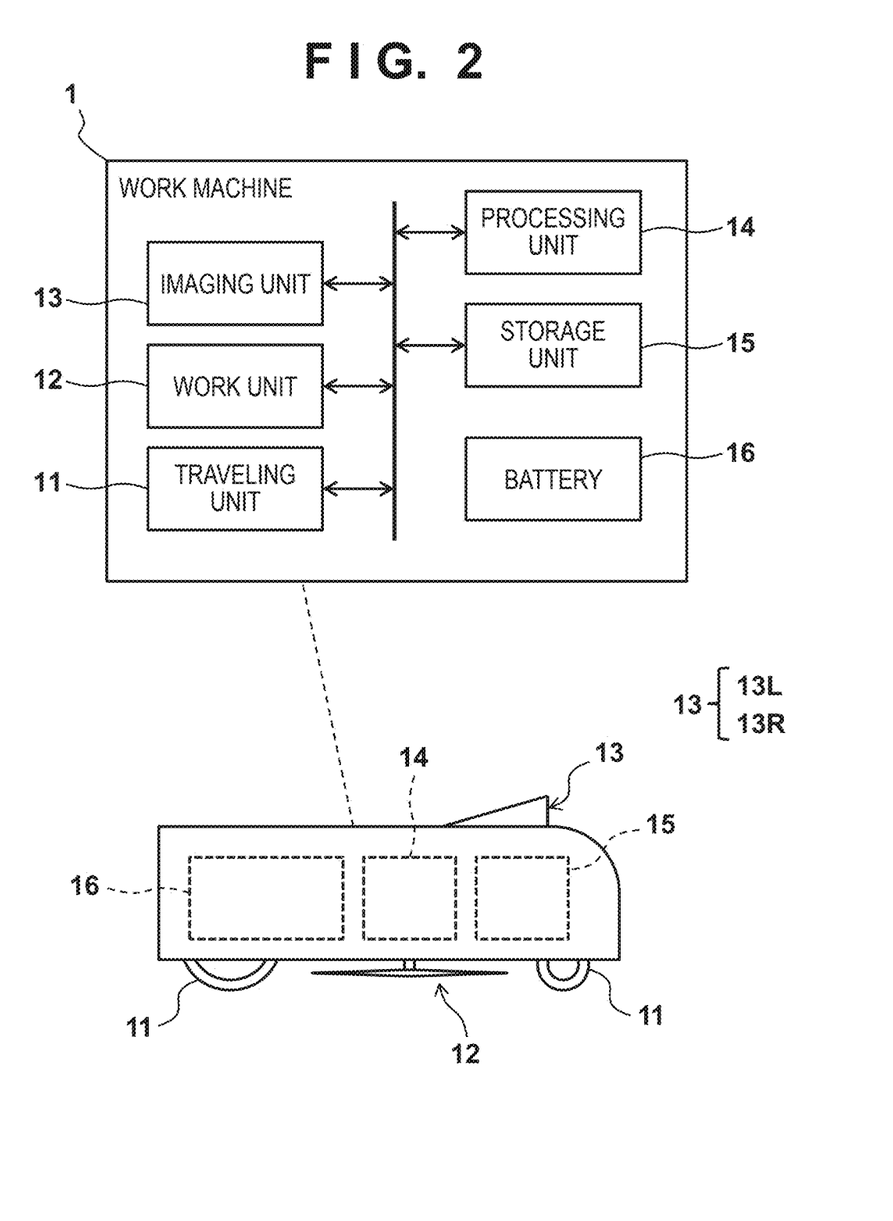
FIG. 2 is a block diagram illustrating a configuration example of a work machine.
Figure 3A:
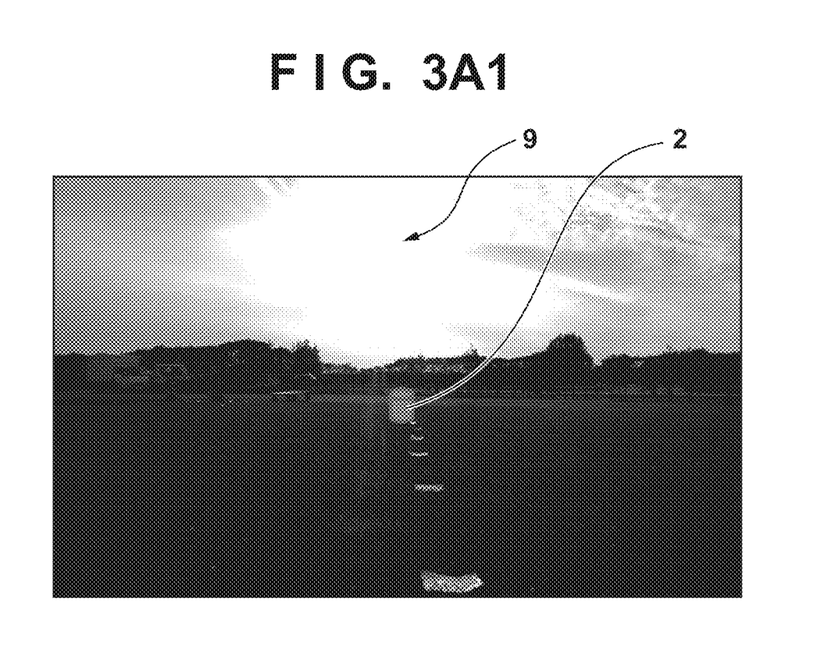
Figure 3A:
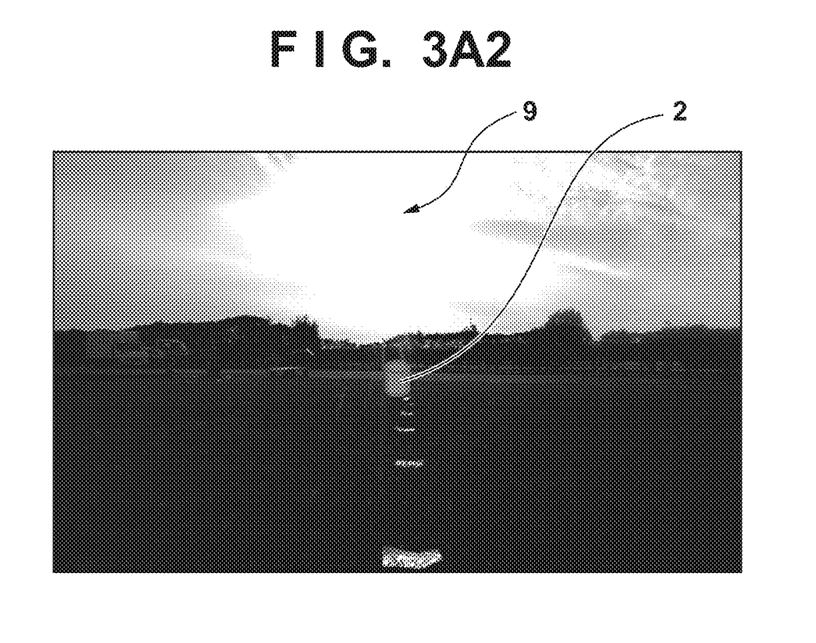
Figure 3B:
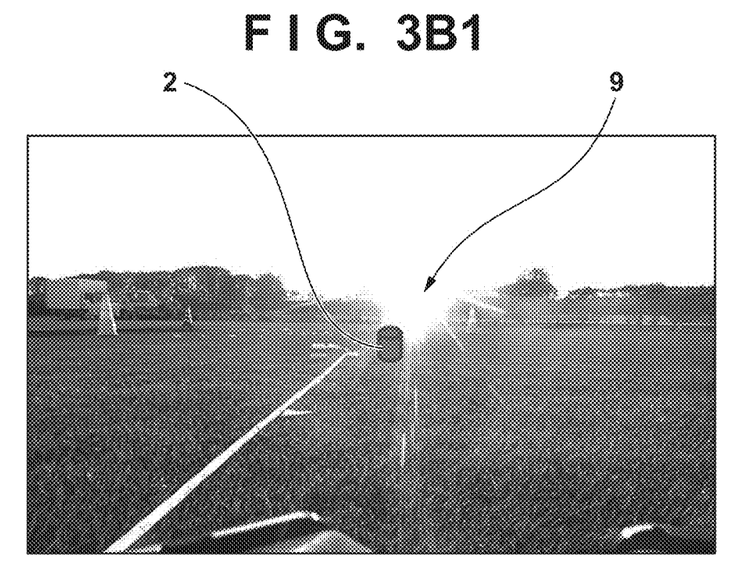
Figure 3B:
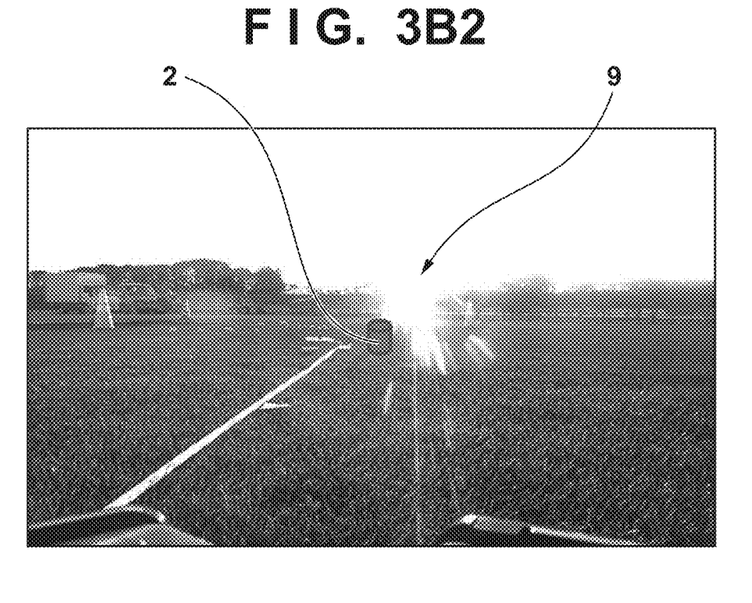

FIG. 2 is a block diagram illustrating a configuration example of the work machine 1. The work machine 1 includes a traveling unit 11, a work unit 12, an imaging unit 13, a processing unit 14, a storage unit 15, and a battery 16.

The traveling unit 11 is provided at a lower part of the vehicle body of the work machine 1, so that the work machine 1 is configured to be capable of moving forward, moving backward, and making a turn (a left turn/a right turn). In the present embodiment, a total of four wheels including two front wheels that are driven wheels and two rear wheels that are drive wheels are used as the traveling unit 11 to achieve a four-wheel drive. However, the number of the wheels is not limited to this. Making a turn mentioned here can be interpreted in a broad sense, and includes, for example, not only changing the traveling direction by driving the left and right wheels in the same rotation direction and at different rotation speeds from each other (with a movement in a front-and-rear direction of the vehicle body) but also making a direction change by driving the left and right wheels at the same rotation speed and in different rotation directions from each other (without a movement in the front-rear direction of the vehicle body), that is, so-called a spin turn. As another embodiment, a crawler-type traveling body may be used instead of the traveling unit 11 with which four-wheel travel is achievable.

The work unit 12 is provided at a lower part of the vehicle body of the work machine 1, and is configured to be capable of conducting the predetermined work (here, lawn mowing). In the present embodiment, for example, a lawn mowing blade configured to be rotatable and movable up and down is used for the work unit 12, and such a blade is lowered to be in a rotating state (operating state) when conducting the work, and is raised to be in a non-rotating state (non-operating state) when not conducting the work. The work machine 1 travels in the work area WR while maintaining the work unit 12 in the operating state, and thus conducts the lawn mowing in the area where the work machine 1 has passed.

The imaging unit 13 is configured to be capable of imaging the surrounding environment of the work machine 1, and in the present embodiment, is capable of imaging a situation in front of the work machine 1. The imaging unit 13 can be installed, for example, in an upper part of the vehicle body and/or a front part of the work machine 1. In the present embodiment, an electronic camera including a CMOS image sensor is used for the imaging unit 13. However, in another embodiment, another imaging device such as an electronic camera including a CCD image sensor may be used. Further, in the present embodiment, a pair of left and right imaging units 13 (which are configured to be imaging units 13L and 13R, and can also be referred to as a compound-eye camera) are provided in order to make it possible to measure the distance to the imaging object, based on, for example, triangulation.

The processing unit 14 performs a predetermined process on an imaging result by the imaging unit 13 (image data acquired by the imaging unit 13 or an image indicated by the image data, and hereinafter, simply referred to as an "imaging result" in some cases), and controls driving of the traveling unit 11, based on a result of the process. For example, in a case where the object 2 is included in the imaging result, the processing unit 14 causes the work machine 1 to make a turn before the object 2 by a predetermined distance. That is, when the imaging unit 13 detects the object 2, the processing unit 14 controls the traveling unit 11 so as to avoid contact between the work machine 1 and the object 2, and causes the work machine 1 to make a turn. Details of this turning mode will be described later.

Note that, in the present embodiment, the processing unit 14 is a processor (processing device) including a CPU and a memory, and its functions are implemented by a predetermined program being executed. In another embodiment, the processing unit 14 may include a semiconductor device such as a programmable logic device (PLD) or an application specific semiconductor integrated circuit (ASIC). That is, the functions of the processing unit 14 can be implemented with any of hardware or software.

Although its details will be described later, the storage unit 15 stores a travel controlling parameters to be used when the work machine 1 makes a turn as described above, that is, when the processing unit 14 controls the driving of the traveling unit 11. It is sufficient if a nonvolatile memory such as an electrically erasable programmable read only memory (EEPROM) is used for the storage unit 15.

The battery 16 is capable of supplying electric power corresponding individually to the traveling unit 11, the work unit 12, the imaging unit 13, the processing unit 14, and the storage unit 15 through a known voltage converter. As described above, the battery 16 is configured to be chargeable while the work machine 1 is on standby in the station 3. For example, a secondary battery such as a lithium-ion battery can be used for the battery 16.

With such a configuration, the work machine 1 is capable of appropriately conducting the predetermined work (here, lawn mowing) while traveling in the work area WR. For example, when a work start time comes, the work machine 1 enters the work area WR from the station 3, makes a turn to adjust its orientation, and then conducts the work while moving straight. Then, upon detection of the object 2, the work machine 1 makes a turn in response to the detection to avoid the contact with the object 2, and then conducts the work while moving straight again. The work machine 1 repeats such an operation. Note that a turning angle at the time of making a turn (an angle formed by a traveling direction before making the turn and a traveling direction after making the turn) is optionally selected within a predetermined range. Accordingly, the work will be completed without unevenness in the entire work area WR in the long term. In this manner, the work in the work area WR continues until a work end time. When the work end time comes, the work machine 1 returns to the station 3, and the battery 16 is charged until the next work start time comes. Such a work machine 1 can also be referred to as a self-propelled work machine, an unmanned traveling work machine, or the like.

The imaging unit 13, by the way, is configured with a CMOS image sensor or the like as described above, that is, photoelectrically converts incident light and detects the incident light to acquire image data indicating a situation in front of the work machine 1 as an imaging result. For this reason, in a case where a light source having luminance equal to or larger than a predetermined value (for example, the sun, facility lighting, and the like) is included in an imaging range of the imaging unit 13, the imaging result may be in a backlight state, and there is a possibility that the detection accuracy of the object 2 is degraded.

FIG. 3(A1) illustrates an example of an imaging result by the imaging unit 13L in a case where the sun as a light source 9 exists at a relatively high position (upper part in the image) within the imaging range of the imaging unit 13, and FIG. 3(A2) illustrates an example of an imaging result by the imaging unit 13R corresponding to this. In addition, FIG. 3(B1) illustrates an example of an imaging result by the imaging unit 13L in a case where the sun as the light source 9 exists at a relatively low position (central part in the image) in the imaging range of the imaging unit 13, and FIG. 3(B2) illustrates an example of an imaging result by the imaging unit 13R corresponding to this.

In the examples of FIGS. 3(A1) and 3(A2), the situation of the work area WR and the object 2 are relatively dark due to the backlight, and it is difficult to measure the distance from the work machine 1 to the object 2 with high accuracy, based on the triangulation. In addition, in the examples of FIGS. 3(B1) and 3(B2), the sun as the light source 9 and the object 2 are too close to each other, and it is difficult to detect the object 2 itself. Therefore, it is more difficult to measure the distance from the work machine 1 to the object 2, based on the triangulation.

For this reason, it is conceivable that in a case where the imaging result is in the backlight state, the detection accuracy of the object 2 is degraded, and the distance from the work machine 1 to the object 2 is not appropriately measured. In such a case, it is difficult for the work machine 1 to appropriately avoid the contact with the object 2 in the conventional travel control, and it may be difficult to maintain the stable travel in the work area WR.

Figure 4:
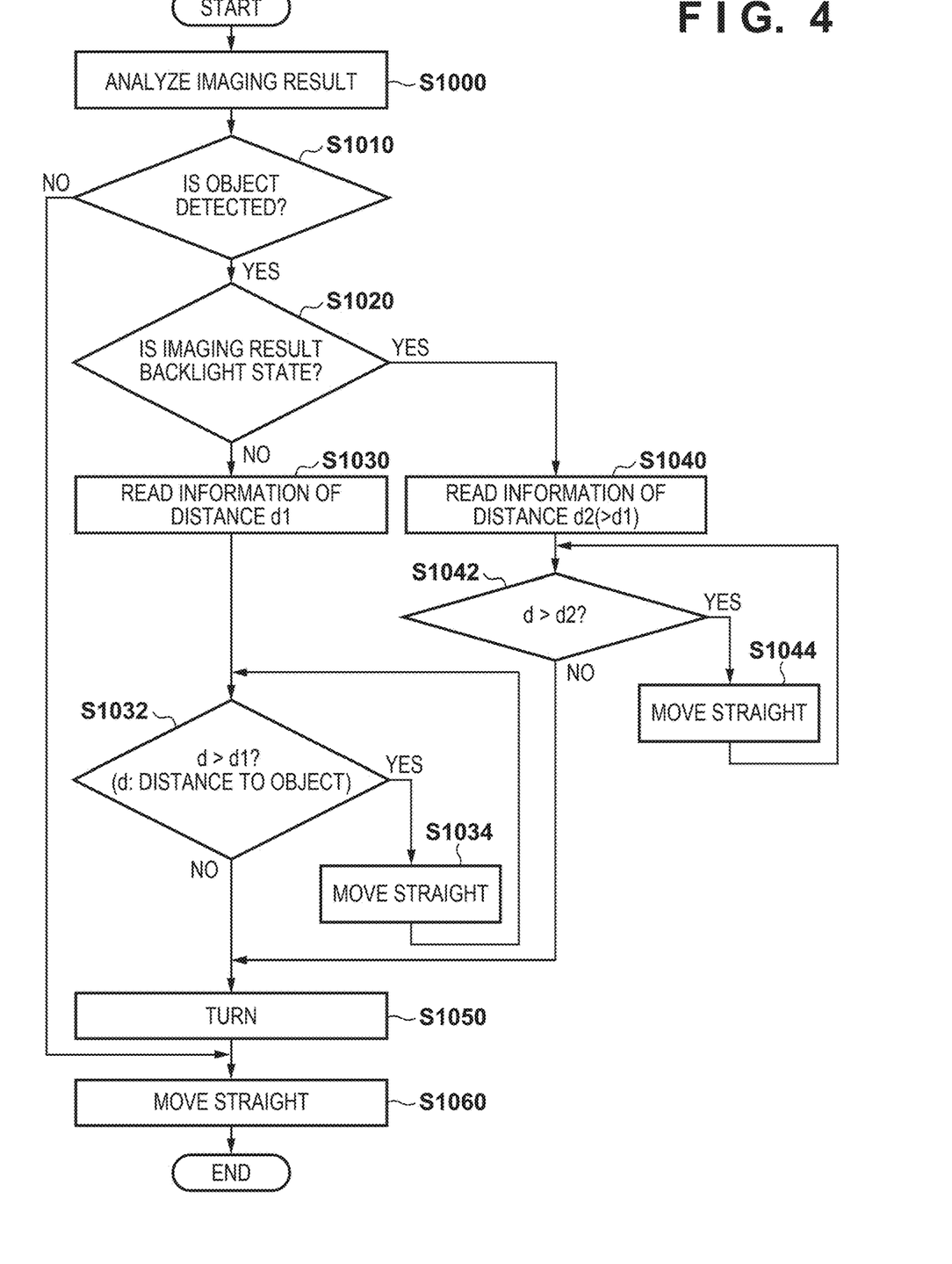
FIG. 4 is a flowchart illustrating an example of contents of travel control by a processing unit.

FIG. 4 is a flowchart illustrating an example of contents of travel control by the processing unit 14. The present flowchart is mainly performed by the processing unit 14, and its outline is that when the work machine 1 starts to make a turn in response to the detection of the object 2, the distance from the work machine 1 to the object 2 is changed, based on whether the imaging result is in the backlight state. It is assumed that the present flowchart is repeatedly performed while the work machine 1 is conducting the work.

In step S1000 (hereinafter, simply referred to as "S1000", and this applies to other steps to be described later), an imaging result (image data) from the imaging unit 13 is analyzed. In the present embodiment, the object 2 is detected by doing a known image analysis using the image data that have been acquired by the two imaging units 13L and 13R. This image analysis may be done on each of two pieces of image data that have been acquired by the imaging units 13L and 13R, or may be performed alternatively/incidentally on their composite data.

In S1010, it is determined whether the object 2 has been detected by the image analysis in S1000. In a case where the object 2 is detected, the process proceeds to S1020, and in the other case, the process proceeds to S1060.

In S1020, the degree of the backlight state in the imaging result is determined. In order to facilitate the understanding, in the present embodiment, whether the imaging result is in the backlight state is determined, based on whether the degree of the backlight state satisfies a criterion. However, in another embodiment, the degree of the backlight state may be classified into two or more stages based on two or more criteria.

In the present embodiment, the backlight state is in a state in which the light source having luminance equal to or larger than a predetermined value is included in the imaging range (at least a predetermined region in the imaging range) of the imaging unit 13, whereas any other state is in the front-light state. In a case where the imaging result is in the front-light state, the process proceeds to S1030, and in a case where the imaging result is in the backlight state, the process proceeds to S1040.

In S1030, in response to the determination of the front-light state in S1020, information indicating a distance d1, which is one of the above-described travel controlling parameters, is read from the storage unit 15.

In S1032, it is determined that whether the distance (set to a distance d) from the work machine 1 to the object 2 detected in S1010 is larger than the above distance d1. In a case where the distance d is larger than the distance d1 (when d>d1), the process proceeds to S1034, and in the other case (when d≤d1), the process proceeds to S1050.

In S1034, the work machine 1 is caused to move straight, and the process returns to S1032. The distance for moving straight in this situation may be set beforehand, or may be determined based on the vehicle speed of the work machine 1.

In S1040, in response to the determination of the backlight state in S1020, information indicating a distance d2, which is one of the above-described travel controlling parameters, is read from the storage unit 15. The distance d2 is longer than the distance d1 (d2>d1).

In S1042, it is determined that whether the distance d from the work machine 1 to the object 2 detected in S1010 is larger than the distance d2. In a case where the distance d is larger than the distance d2 (when d>d2), the process proceeds to S1044, and in the other case (when d≤d2), the process proceeds to S1050.

In S1044, the work machine 1 is caused to move straight, and the process returns to S1042. The distance for moving straight in this situation may be set beforehand, or may be determined based on the vehicle speed of the work machine 1, but can be preferably set to be shorter than the distance for moving straight in the case of S1034.

In S1050, the work machine 1 is caused to make a turn. As described above, the turning angle in this situation is optionally selected within a predetermined range. Accordingly, the work without unevenness is achievable in the entire work area WR.

In S1060, the work machine 1 is continuously conducting the work while moving straight, and the present flowchart ends (in a case of continuously conducting the work, the process returns to S1000).

Figure 5A:
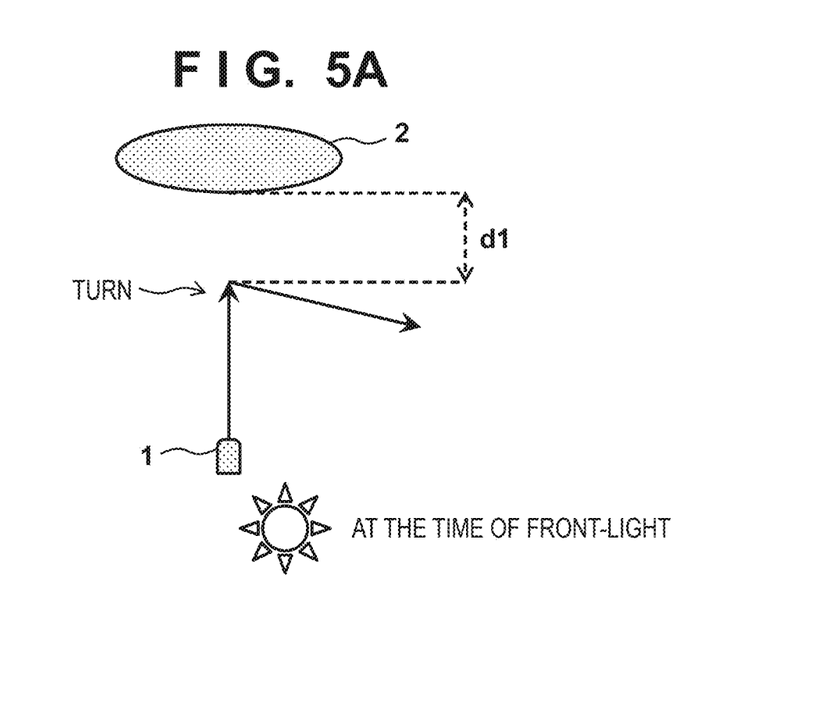
FIG. 5A is a schematic diagram illustrating an example of a traveling mode in a front-light state.
Figure 5B:
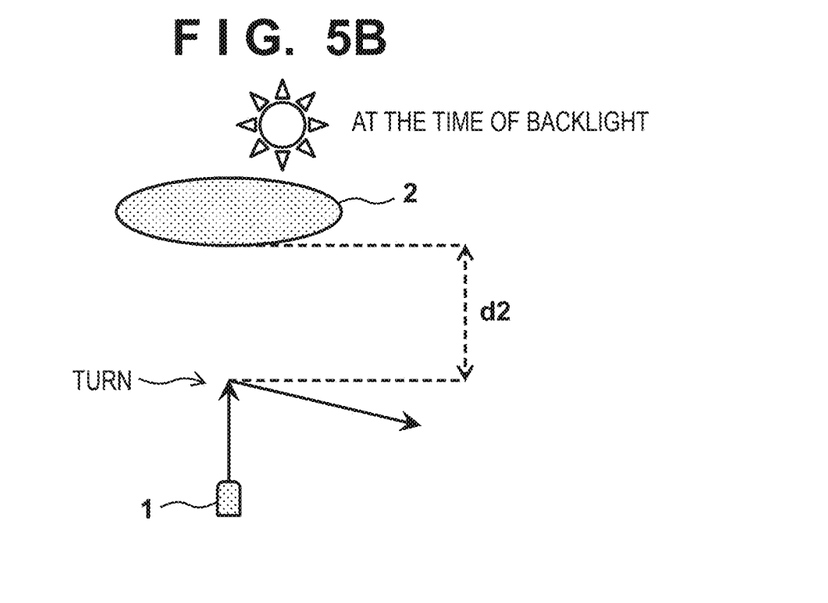
FIG. 5B is a schematic diagram illustrating an example of a traveling mode in a backlight state.

FIG. 5(A) illustrates an example of a traveling mode at the time of front-light, and FIG. 5(B) illustrates an example of a traveling mode at the time of backlight. According to the present embodiment, at the time of front-light, the work machine 1 makes a turn when the distance d from the work machine 1 to the object 2 is equal to the distance d1 (see FIG. 5(A)). On the other hand, at the time of backlight, the work machine 1 makes a turn when the distance d from the work machine 1 to the object 2 is equal to the distance d2 (>d1) (see FIG. 5(B)).

Note that in order to facilitate the understanding, making a turn here is achieved by the left and right wheels being driven at the same rotation speed and in different rotation directions from each other to make a direction change without moving in the front-and-rear direction of the vehicle body (see FIGS. 5(A) and 5(B)).

As described above, in a case where the imaging result is in the backlight state, there is a possibility that the calculation accuracy of the distance d is degraded. Therefore, in the present embodiment, by setting beforehand the distance d2 from the work machine 1 to the object 2 at the time of making a turn to be large, it becomes possible to avoid the contact with the object 2 with certainty. Therefore, it is sufficient to set the distance d2 to be larger than the distance d1 by an amount corresponding to a decrease in the calculation accuracy of the distance d.

As described heretofore, according to the present embodiment, in S1010, the processing unit 14 detects the object 2, based on the imaging result by the imaging unit 13. Then, in S1020, the processing unit 14 determines the degree of the backlight state in the imaging result, and determines whether the imaging result is in the backlight state based on a predetermined criterion. In a case where the object 2 is detected in S1010, the processing unit 14 causes the work machine 1 to make a turn in front of the object 2, in S1050. Here, in a case where it is determined in S1020 that the imaging result is in the backlight state, the processing unit 14 sets the distance d2 from the object 2 to the work machine 1 when causing the work machine 1 to make a turn in S1050 to be larger than a case where it is determined that the imaging result is not in the backlight state (than the distance d1). According to such travel control, the work machine 1 is capable of appropriately continuing the stable travel without coming into contact with the object 2 even in the backlight state, and is capable of appropriately conducting, for example, the predetermined work.

The storage unit 15 stores information indicating the distance from the object 2 to the work machine 1 when the work machine 1 is caused to make a turn in response to the detection of the object 2, and in the present embodiment, stores information indicating the distance d1 for the front-light and the distance d2 (>d1) for the backlight. By storing the distance d1 or d2 to the detected object 2 at the time of making a turn in the storage unit 15 beforehand, the present embodiment is enabled in a relatively easy manner. For example, by reading the above information from the storage unit 15, the processing unit 14 is capable of causing the work machine 1 to make a turn at a position before the detected object 2 by the distance d1, for example, in the case where the front-light state is determined. In addition, for example, in the case where the backlight state is determined, the processing unit 14 is capable of causing the work machine to make a turn at a position before the detected object 2 by the distance d2.

In the present embodiment, an aspect in which the work machine 1 makes a turn in response to the detection of the object 2 has been given as an example. However, it is sufficient if the contact between the work machine 1 and the object 2 is avoided. Therefore, the work machine 1 may stop (temporarily stop) or move backward instead of making a turn. For example, the work machine 1 may be prevented from coming into contact with the object 2 by making a turn/moving backward after stopping.

In the present embodiment, the determination of the degree of the backlight state in the imaging result (S1020) can be made, based on whether the imaging result includes the light source 9 having luminance equal to or larger than a predetermined value. Typical examples of the light source 9 include the sun, facility lighting, and the like, and in a case where such a light source 9 is included in the imaging result, the imaging result can be in the backlight state.

Figure 6A:
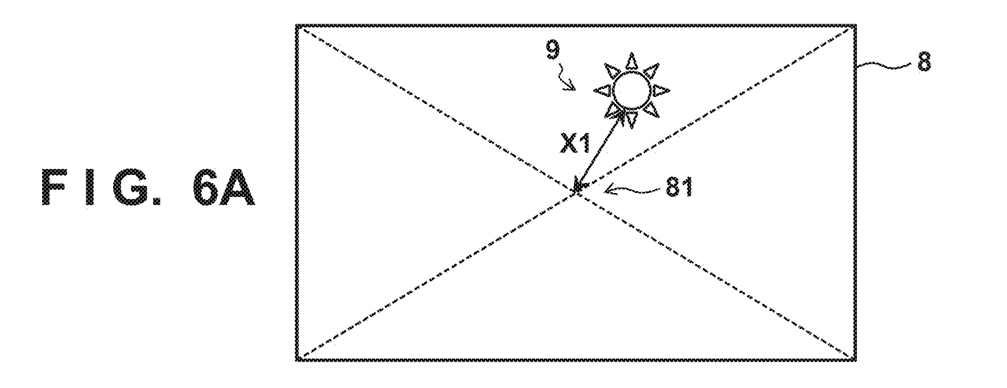
FIG. 6A is a diagram illustrating an example of a method for determining the front-light state/backlight state.

As an example, as illustrated in FIG. 6(A), it is possible to determine whether the imaging result is in the backlight state, based on a distance X1 from the center (for example, a position where two diagonal lines of an image intersect with each other) 81 to the light source 9 in an image 8 indicated by the imaging result.

Figure 6B:
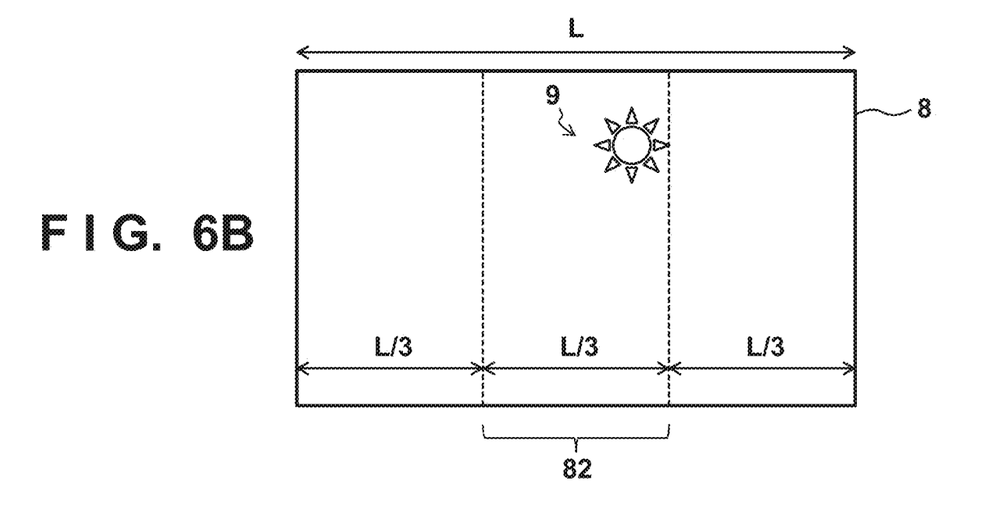
FIG. 6B is a diagram illustrating an example of the method for determining the front-light state/backlight state.

As another example, as illustrated in FIG. 6(B), in a case where the light source 9 is included in a central region 82 in the image 8, it is also possible to determine that the imaging result is in the backlight state. In this case, in a case where L represents the length of the image 8 in a left-and-right direction, the central region 82 may be a region between a position of L/3 from one end and a position of L/3 from the other end in the left-and-right direction.

Figure 6C:
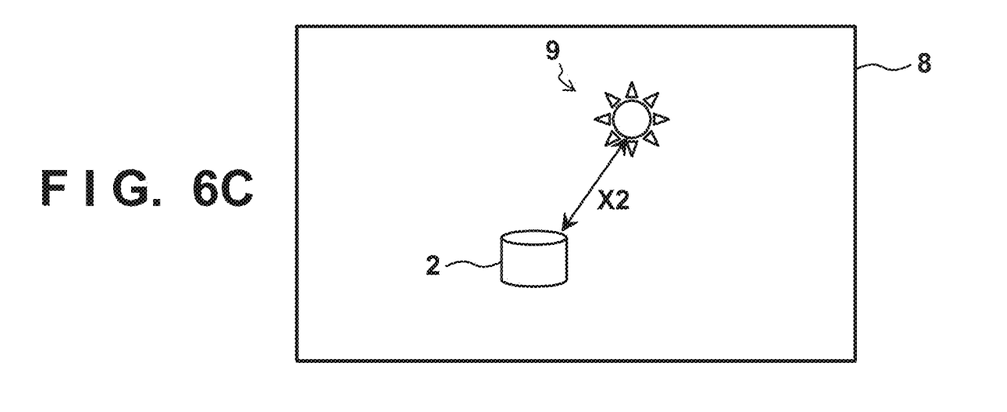
FIG. 6C is a diagram illustrating an example of the method for determining the front-light state/backlight state.

As still another example, as illustrated in FIG. 6(C), it is also possible to determine whether the imaging result is in the backlight state, based on a distance X2 from the detected object 2 to the light source 9 in the image 8.

In the present embodiment, the front-light state/backlight state is determined, based on the imaging result (S1020). However, this determination is also achievable in another known method. For example, the work machine 1 may include a geomagnetic sensor capable of detecting the orientation of the vehicle body with respect to cardinal directions and a timer capable of measuring the time, and the above determination may be made, based on a detection result of the geomagnetic sensor and a measurement result of the timer. Alternatively, the work machine 1 may include an illuminance sensor capable of measuring luminance in all cardinal directions (at least luminance in front of and behind the vehicle body), and the above determination may be made, based on a measurement result of the illuminance sensor.

Further, the determination of the degree of the backlight state in the imaging result (S1020) is relative, and the distance (d1, d2, or the like) from the object 2 to the work machine 1 for causing the work machine 1 to make a turn in S1050 may be changed in accordance with the magnitude of the degree of the backlight state. That is, the case where the backlight state is determined in S1020 denotes a case where the degree of the backlight state is determined to be larger than a predetermined criterion, whereas the case where the backlight state is not determined in S1020 denotes a case where the degree of the backlight state is determined to be smaller than the criterion.

Second Embodiment

In the first embodiment described above, as an aspect of making a turn in response to the detection of the object 2, the description has been given with regard to the example in which the left and right wheels are driven at the same rotation speed and in different rotation directions to make a direction change without moving in the front-and-rear direction of the vehicle body (see FIGS. 5(A) and 5(B)). The second embodiment is different from the first embodiment, as another aspect of making a turn, in that the traveling direction is changed by the left and right wheels being driven in the same rotation direction and at different rotation speeds. That is, in the second embodiment, the work machine 1 avoids contact with the object 2 by gently changing the traveling direction while moving forward. As will be described later, according to the present embodiment, it is possible to suppress a decrease in work efficiency associated with making a turn.

Figure 7A:
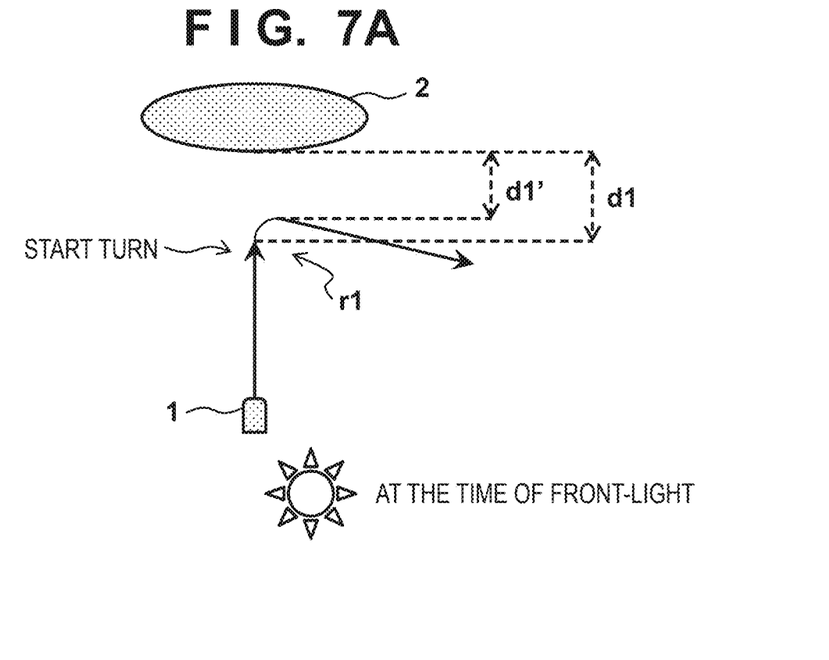
FIG. 7A is a schematic diagram illustrating an example of the traveling mode in the front-light state.
Figure 7B:
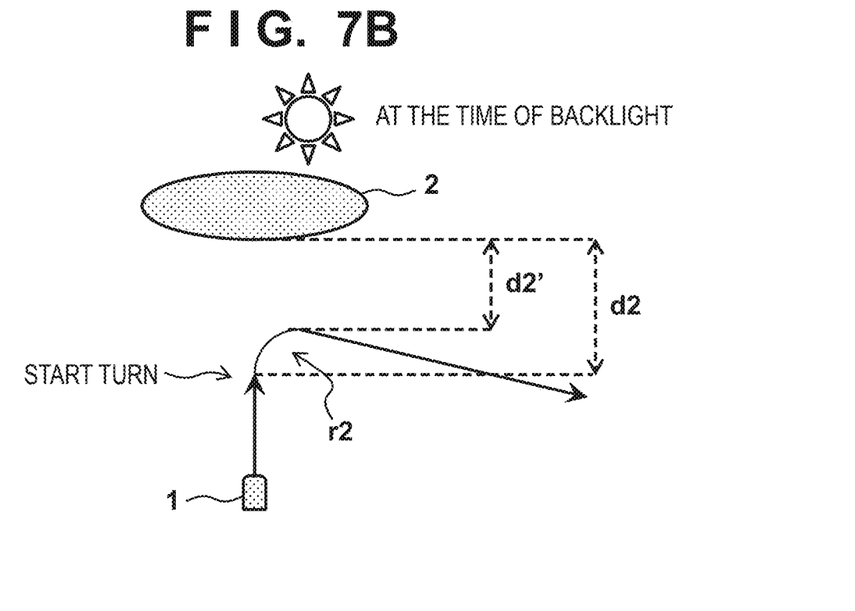
FIG. 7B is a schematic diagram illustrating an example of the traveling mode in the backlight state.

FIG. 7(A) illustrates an example of a traveling mode at the time of front-light, and FIG. 7(B) illustrates an example of a traveling mode at the time of backlight. In the present embodiment, at the time of front-light, the work machine 1 starts to make a turn, when the distance d from the work machine 1 to the object 2 is equal to the distance d1 (see FIG. 5(A)). On the other hand, at the time of backlight, the work machine 1 starts to make a turn, when the distance d from the work machine 1 to the object 2 is equal to the distance d2 (>d1) (see FIG. 5(B)).

Here, in a case where a radius r1 represents a turning radius at the time of front-light and a radius r2 represents a turning radius at the time of backlight, r2>r1 is desirably established (in this regard, in the first embodiment, it can be said that r1=r2=0 is established). That is, according to the present embodiment, the work machine 1 makes a turn more gently at the time of backlight than at the time of front-light.

In general, the influence of the backlight can be reduced relatively quickly by a change in the traveling direction (that is, the orientation of the imaging unit 13), that is, can be reduced substantially at the same time when starting to make the turn. According to the present embodiment, by setting the turning radius r2 at the time of backlight to be larger than the turning radius r1 at the time of front-light, it is possible to get closer to the object 2 while making a turn than the case in the first embodiment. As a result, it is possible to make a distance d1' when the work machine 1 gets closest to the object 2 by making a turn at the time of front-light and a distance d2' when the work machine 1 gests closest to the object 2 by making a turn at the time of backlight close to each other/substantially equal to each other. Therefore, according to the present embodiment, it can be said that it is possible to suppress a decrease in work efficiency as compared with the first embodiment.

In addition, according to the present embodiment, the influence of the backlight can be reduced substantially at the same time when starting to make a turn, it is also possible to reduce a difference between the distance d1 in the case where the front-light state is determined and the distance d2 in the case where the backlight state is determined in S1020. This is advantageous for improving the work efficiency. This can also be mentioned in other words as follows.

That is, the traveling unit 11 has, as a traveling mode for causing the work machine 1 to make a turn, a sharp turning mode and a gentle turning mode in which the turning radius is larger than that in the sharp turning mode. In the case where the front-light state is determined in S1020, the processing unit 14, in S1050, causes the work machine 1 to make a turn by setting the traveling unit 11 to the sharp turning mode, whereas in the case where the backlight state is determined, the processing unit 14 causes the work machine 1 to make a turn by setting the traveling unit 11 to the gentle turning mode. According to the present embodiment, in the front-light state, the work machine 1 conducts the work up to a position relatively close to the object 2 (a position where the distance to the object 2 is the distance d1), and makes a turn in the sharp turning mode to be capable of avoiding contact with the object 2. On the other hand, in the backlight state, the work machine 1 gently makes a turn at a position spaced apart from the object 2 (a position where the distance to the object 2 is the distance d2). Thus, the influence of the backlight is reduced (it becomes possible to calculate the distance to the object 2 with high accuracy). Then, the work machine 1 is capable of continuously conducting the work while getting closer to the object 2 and avoiding contact with the object 2.

Note that the sharp turning mode is achievable by relatively increasing the difference in the rotation speed between the left and right wheels, and the gentle turning mode is achievable by relatively reducing the difference in the rotation speed between the left and right wheels.

Other Remarks

In the above-described embodiment, the processing unit 14 is mounted on the work machine 1, but may be configured to be capable of communicating with the work machine 1 and installed at a position separated from the work machine 1. That is, the travel control for the work machine 1 described in the embodiments may be achieved by remote control by a processing device corresponding to the processing unit 14. The same effects as those in the embodiments are enabled also in such a method.

In addition, in the embodiments, the lawn mower as the work machine 1 has been given as an example. However, the work machine 1 is not limited to the lawn mower. That is, the contents in the embodiments are also applicable to a snow blower including an auger as the work unit 12, or are also applicable to an agricultural work machine such as a cultivator.

In the above description, in order to facilitate the understanding, each element has been described with a name related to its functional aspect. However, each element is not limited to one having, as a main function, the function described in the embodiments, and may be one having the function as an auxiliary function.

SUMMARY OF THE EMBODIMENTS

A first aspect is a self-propelled work machine (1) that conducts work in a work area (WR), comprising an imaging unit (13) configured to capture an image of a surrounding environment, and a processing unit (14), wherein the processing unit performs a first process (S1010) of detecting a predetermined object (2), based on an imaging result by the imaging unit, a second process (S1020) of determining a degree of a backlight state in the imaging result, and a third process (S1050) of conducting travel control of the work machine for any of making a turn, stopping, and moving backward in front of the object that has been detected, and in a case where it is determined in the second process that the imaging result is in the backlight state, the processing unit sets a distance from the object that has been detected when conducting the travel control in the third process to the work machine to be larger than a distance in a case where it is determined in the second process that the imaging result is not in the backlight state (S1030, S1040).

According to the first aspect, the work machine is capable of appropriately continuing the stable travel without coming into contact with the object even in the backlight state, and is capable of appropriately conducting, for example, the predetermined work.

As a second aspect, in the second process, the processing unit determines the degree of the backlight state in the imaging result, based on luminance of a light source included in the imaging result.

According to the second aspect, it enables to realize the above first aspect appropriately.

As a third aspect, in the second process, the processing unit determines the degree of the backlight state in the imaging result, based on a distance from a center to the light source in the image indicated by the imaging result.

The influence of the backlight is usually larger, as the distance from the center of the image to the light source is shorter. Therefore, according to the third aspect, the second aspect is appropriately enabled.

As a fourth aspect, the light source has luminance equal to or larger than a predetermined value, and in the second process, the processing unit determines that the imaging result is in the backlight state in a case where the light source is included in a central region in the image indicated by the imaging result.

In a case where the light source is included in the central region of the image, the influence of the backlight is usually large. Therefore, according to the fourth aspect, the second and third aspects are appropriately enabled.

As a fifth aspect, in a case where L represents a length of the image in a left-and-right direction, the central region includes a region between a position of L/3 from one end and a position of L/3 from the other end in the left-and-right direction.

The influence of the backlight is usually large in the central region in the left-and-right direction rather than the central region in the up-and-down direction in the image. Therefore, according to the fifth aspect, the fourth aspect is appropriately enabled.

As a sixth aspect, in the second process, the processing unit determines the degree of the backlight state in the imaging result, based on a distance from the object that has been detected to the light source in the image indicated by the imaging result.

The influence of the backlight is usually larger, as getting closer to the light source. Therefore, according to the sixth aspect, the second to fifth aspects are appropriately enabled.

As a seventh aspect, further comprising a storage unit (15) configured to store information indicating a first distance (d1) and a second distance (d2), the second distance being longer than the first distance, wherein in the third process, the processing unit reads the information from the storage unit, conducts the travel control at a position before the object that has been detected by the first distance in a case where it is determined that the imaging result is not in the backlight state in the second process, and conducts the travel control at a position before the object that has been detected by the second distance in a case where it is determined that the imaging result is in the backlight state in the second process.

The distance to the detected object at the time of making a turn is stored in the storage unit beforehand. Therefore, the first to sixth aspects are enabled in a relatively easy manner.

As an eighth aspect, the predetermined object includes an installation object (21) for partitioning the work area and/or an obstacle (22) existing in the work area.

According to the eighth aspect, the work machine is capable of appropriately continuing the stable travel without coming into contact with the above-described objects individually.

As a ninth aspect, further comprising a traveling unit (11) configured to cause the work machine to travel, wherein in the third process, the processing unit causes the work machine to make a turn, the traveling unit has a first traveling mode (a sharp turning mode) and a second traveling mode (a gentle turning mode) as traveling modes for causing the work machine to make the turn, the second traveling mode having a turning radius larger than a turning radius of the first traveling mode, and in the third process, in a case where it is determined that the imaging result is not in the backlight state in the second process, the processing unit sets the traveling unit to the first traveling mode to cause the work machine to make the turn, and in a case where it is determined that the imaging result is in the backlight state in the second process, the processing unit sets the traveling unit to the second traveling mode to cause the work machine to make the turn.

In general, the influence of the backlight can be reduced relatively quickly by a change in the traveling direction (that is, the orientation of the imaging unit). Therefore, according to the ninth aspect, the influence of the backlight can be reduced substantially at the same time when starting to make a turn. In addition, according to the ninth aspect, it is also possible to reduce a difference in the distance from the detected object to the work machine when the work machine is caused to make a turn in the third process between the case where the backlight state is determined in the second process and the case where the backlight state is not determined in the second process. Therefore, it is advantageous for improving the work efficiency.

A tenth aspect is a processing device (14), comprising a detection unit (S1010) configured to detect a predetermined object (2), based on an imaging result by an imaging unit (13), a determination unit (S1020) configured to determine a degree of a backlight state in the imaging result, and a travel control unit configured to conduct travel control of a vehicle (1) for any of making a turn, stopping, and moving backward in front of the object that has been detected, wherein in a case where the determination unit determines that the imaging result is in the backlight state, the travel control unit sets a distance from the object that has been detected when the travel control unit conducts the travel control to the vehicle to be larger than a distance in a case where the determination unit determines that the imaging result is not in the backlight state (S1030, S1040).

The processing device described above can be mounted on a known work machine, or the travel control of a known work machine is enabled by remote control. Therefore, effects similar to that in the first aspect are enabled.

The invention is not limited to the foregoing embodiments, and various variations/changes are possible within the spirit of the invention.

The invention claimed is:

1. A self-propelled work machine that conducts work in a work area, comprising:
    an imaging sensor configured to capture an image of a surrounding environment;
    a nonvolatile memory; and
    at least one processor circuit with a memory comprising instructions that, when executed by the processor circuit, cause the at least one processor circuit to perform at least:
        a first process of detecting a predetermined object, based on an imaging result by the imaging sensor,
        a second process of determining a degree of a backlight state in the imaging result, and
        a third process of conducting travel control of the work machine for making a turn in front of the object that has been detected,
        the nonvolatile memory stores information indicating a first distance and a second distance, the second distance being longer than the first distance,
        in the third process, the at least one processor circuit reads the information from the nonvolatile memory,
conducts the turn at a position before the object that has been detected by the first distance in a case where it is determined that the imaging result is not in the backlight state in the second process, and
conducts the turn at a position before the object that has been detected by the second distance in a case where it is determined that the imaging result is in the backlight state in the second process, and
the second distance is set to be stored in the nonvolatile memory, such that a distance from the work machine to the detected object while conducting the turn in a traveling direction of the work machine before conducting the turn is same between (i) in a case where it is determined that the imaging result is not in the backlight state, and (ii) in a case where it is determined that the imaging result is in the backlight state.

2. The work machine according to claim 1, wherein in the second process, the at least one processor circuit determines the degree of the backlight state in the imaging result, based on luminance of a light source included in the imaging result.

3. The work machine according to claim 2, wherein in the second process, the at least one processor circuit determines the degree of the backlight state in the imaging result, based on a distance from a center to the light source in the image indicated by the imaging result.

4. The work machine according to claim 2, wherein
the light source has luminance equal to or larger than a predetermined value, and
in the second process, the at least one processor circuit determines that the imaging result is in the backlight state in a case where the light source is included in a central region in the image indicated by the imaging result.

5. The work machine according to claim 4, wherein in a case where L represents a length of the image in a left-and-right direction, the central region includes a region between a position of L/3 from one end and a position of L/3 from the other end in the left-and-right direction.

6. The work machine according to claim 2, wherein in the second process, the at least one processor circuit determines the degree of the backlight state in the imaging result, based on a distance from the object that has been detected to the light source in the image indicated by the imaging result.

7. The work machine according to claim 1, wherein the predetermined object includes an installation object for partitioning the work area and/or an obstacle existing in the work area.

8. The work machine according to claim 1, further comprising
one or more wheels configured to cause the work machine to travel, wherein
one or more wheels have a first traveling mode and a second traveling mode as traveling modes for causing the work machine to make the turn, the second traveling mode having a turning radius larger than a turning radius of the first traveling mode, and
in the third process, in a case where it is determined that the imaging result is not in the backlight state in the second process, the at least one processor circuit sets the one or more wheels to the first traveling mode to cause the work machine to make the turn, and in a case where it is determined that the imaging result is in the backlight state in the second process, the at least one processor circuit sets the one or more wheels to the second traveling mode to cause the work machine to make the turn.

9. A processing device for a self-propelled work machine, comprising at least one processor circuit with a memory comprising instructions that, when executed by the processor circuit, cause the at least one processor circuit to at least:
detect a predetermined object, based on an imaging result by an imaging sensor;
determine a degree of a backlight state in the imaging result; and
conduct travel control of a vehicle for making a turn in front of the object that has been detected, wherein
in conducting travel control of the vehicle, the at least one processor circuit
reads information from a nonvolatile memory, the information indicating a first distance and a second distance, the second distance being longer than the first distance,
conducts the turn at a position before the object that has been detected by the first distance in a case where it is determined that the imaging result is not in the backlight state, and
conducts the turn at a position before the object that has been detected by the second distance in a case where it is determined that the imaging result is in the backlight state, and
the second distance is set to be stored in the nonvolatile memory, such that a distance from the work machine to the detected object while conducting the turn in a traveling direction of the work machine before conducting the turn is same between (i) in a case where it is determined that the imaging result is not in the backlight state, and (ii) in a case where it is determined that the imaging result is in the backlight state.

* * * * *